(12) United States Patent
Morris

(10) Patent No.: US 7,720,112 B2
(45) Date of Patent: May 18, 2010

(54) ROUTING OF DATA STREAMS

(75) Inventor: Matt Morris, Bristol (GB)

(73) Assignee: STMicroelectronics Limited, Bristol (GB)

( * ) Notice: Subject to any disclaimer, the term of this patent is extended or adjusted under 35 U.S.C. 154(b) by 1469 days.

(21) Appl. No.: 10/779,466

(22) Filed: Feb. 16, 2004

(65) Prior Publication Data

US 2004/0228342 A1 Nov. 18, 2004

(30) Foreign Application Priority Data

Feb. 24, 2003 (EP) .................................. 03251091

(51) Int. Cl.
*H04J 3/04* (2006.01)
(52) U.S. Cl. .................... 370/535; 370/230.1; 370/428; 370/541
(58) Field of Classification Search ......... 370/535–545, 370/229, 230.1, 235, 237, 428
See application file for complete search history.

(56) References Cited

U.S. PATENT DOCUMENTS

| | | | |
|---|---|---|---|
| 5,862,128 A | 1/1999 | Cooperman et al. | |
| 5,905,725 A | 5/1999 | Sindhu et al. | |
| 6,032,192 A * | 2/2000 | Wegner et al. | 709/238 |
| 6,081,522 A | 6/2000 | Hendel et al. | |
| 6,272,151 B1 * | 8/2001 | Gupta et al. | 370/489 |
| 6,304,552 B1 * | 10/2001 | Chapman et al. | 370/232 |
| 6,421,348 B1 * | 7/2002 | Gaudet et al. | 370/401 |
| 6,687,247 B1 * | 2/2004 | Wilford et al. | 370/392 |
| 7,020,139 B2 * | 3/2006 | Kalkunte et al. | 370/392 |
| 7,212,494 B1 * | 5/2007 | Goldman et | 370/235 |
| 7,218,637 B1 * | 5/2007 | Best et al. | 370/395.4 |
| 7,382,787 B1 * | 6/2008 | Barnes et al. | 370/401 |

OTHER PUBLICATIONS

European Search Report, 03251091.9, dated Jul. 23, 2003.

* cited by examiner

*Primary Examiner*—Pankaj Kumar
*Assistant Examiner*—Mark A Mais
(74) *Attorney, Agent, or Firm*—Gardere Wynne Sewell LLP

(57) ABSTRACT

The routing of data streams is discussed, and particularly routing one or more incoming streams to one or more output destination ports. The ability to merge incoming streams is discussed so that several low bit rate input packet streams can be merged into a higher bit rate output stream. An assignment data structure identifies for each input stream the or each destination to which it is to be routed, and a packet allocation data structure holds information about the packets and information about the destination of the packets to allow a memory holding the packets to be controlled accordingly.

21 Claims, 3 Drawing Sheets

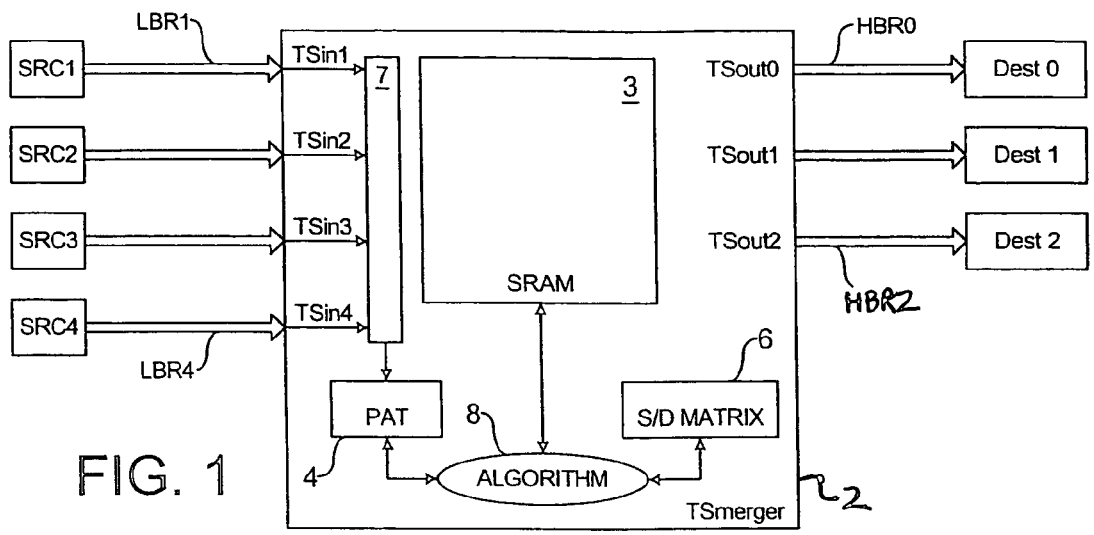
FIG. 1
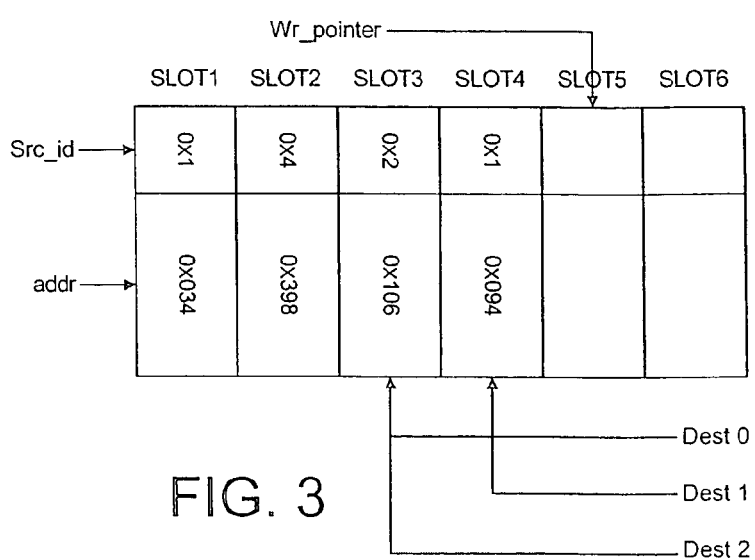
FIG. 2
FIG. 3

At start: all destination pointers point to NULL

ROUTING OF DATA STREAMS

PRIORITY CLAIM

The present application claims priority from European Patent Application No. 03251091.9 filed Feb. 24, 2003, the disclosure of which is hereby incorporated by reference.

BACKGROUND OF THE INVENTION

1. Technical Field of the Invention

The present invention relates to the routing of data streams, and in particular streams constituted by data packets.

2. Description of Related Art

Networks today provide connectivity to a variety of devices such as servers, personal computers, memory storage systems, etc. Most networks provide a wide range of applications and technologies to allow for a multitude of communications to one or more destinations.

As is known in the art, illustrated by U.S. Pat. No. 6,081,522, a network may employ a multi-layer network element to forward received packets from an input port to one or more output ports. The received packets may be scanned for different types of forwarding information, i.e., layer 2 information, layer 3 information, layer 4 information, etc. Based on the results of the scan, a determination is made as to the most appropriate combination of layer 2 or layer 3 forwarding decisions for the received packet. Once the forwarding decisions are made, the received packet is transmitted to the destination.

U.S. Pat. No. 5,905,725 relates to a network utilizing a router to switch a packet between a source and a destination. The router may include a plurality of ports connected to various sources and destinations. The ports connected to sources are termed input ports and each input port includes a data handler. The router also includes output ports and a memory divided into a plurality of memory banks. The data handler divides each packet into one or more fixed length cells. The fixed length cells are transmitted to an input switch that writes a single cell into a cell slot time span to each memory bank. The input switch reads a key from the packet and, based on a destination indicated by a key, an output port associated with the destination is determined. An output switch is alerted to the determination and transfers the determination to the appropriate output port. The output port initiates transfer of the packet from the memory and the output switch.

SUMMARY OF THE INVENTION

A transport stream multiplexer (TSMUX) has been implemented which can route a data stream received as an input to any one of a number of outputs. An aspect of the present invention expands the capabilities of the multiplexer so that a number of input streams can be merged and can be directed to one or more of a plurality of output destinations.

According to one aspect of the present invention there is provided a stream routing unit for routing each of a plurality of input packet streams to any of a plurality of destinations. The stream routing unit includes a plurality of input ports for receiving respective input streams, a plurality of output ports associated with respective destinations to which the input packet streams can be routed, and storage means for holding packets of the input packet streams at addressable locations each identifiable by an address. The stream routing unit also includes an assignment data structure identifying for each input stream at least one destination to which each input packet stream is to be routed. The stream routing unit further includes a packet allocation data structure holding for each new incoming packet a source identifier identifying the origin of the packet and the address in the storage means where the packet is held. The packet allocation data structure also holds information identifying the intended destination of the packet derived from the assignment data structure.

Another aspect of the invention provides a method of routing packet streams from a plurality of sources to any of a plurality of destinations. The method includes receiving the packet streams, identifying for each input packet stream at least one destination to which each input packet stream is to be routed using an assignment data structure, holding each packet of the packet stream at an addressable location identifiable by an address in a storage means, and holding for each new incoming packet a source identifier identifying the origin of the packet and the address in the storage means where the packet is held. The method also includes holding information identifying the intended destination of the packet derived from the assignment data structure, and using the information identifying the intended destination to route the packet from the storage means to at least one output port associated with the respective identified destination(s).

A further aspect of the invention provides a communications system which utilizes a stream routing unit as hereinabove defined together with a plurality of sources for the input packet streams and destinations for receiving output streams.

As described below, the preferred embodiment of the invention provides an intellectual property (block of logic) known as TSmerger which merges multiple lower bit rate transport streams to a single higher bit rate transport stream for processing by a single programmable transport interface (PTI). For example, nine input streams can be merged into three output streams, with each input stream being able to be routed to any output stream, or to multiple destinations.

In the described embodiment, the TSmerger IP is implemented by storing packets of incoming streams in a single SRAM in a stream merger unit, which effectively behaves as a series of first-in first-out buffers (FIFOs).

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 is a schematic diagram of a communications system incorporating a stream routing unit;

FIG. 2 illustrates a source to destination matrix;

FIG. 3 illustrates a packet allocation table;

DETAILED DESCRIPTION OF THE DRAWINGS

Figure 4A:
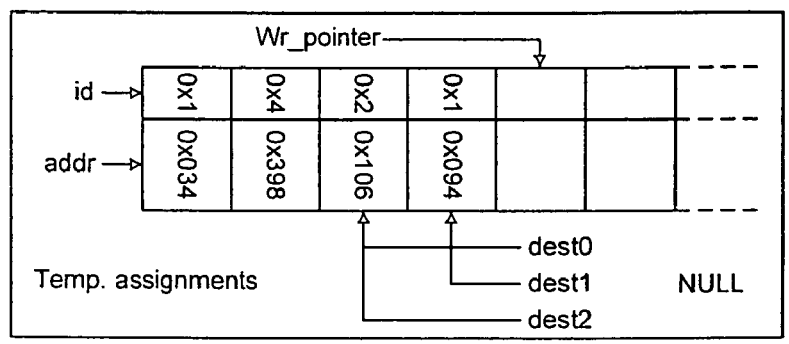
FIGS. 4A to 4D illustrate the assignment of destination pointers associated with the packet allocation table.

FIG. 1 is a schematic diagram of a stream routing unit referred to herein as a TSmerger unit. The TSmerger unit is denoted generally by reference numeral 2 and has a plurality of input ports TSin1 . . . TSin4 for receiving respectively each of a plurality of low bit rate input packet streams LBR1 . . . LBR4. It will be appreciated that in practice any number of input streams may be present, four being illustrated by way of example only. Each input stream LBR1 . . . LBR4 is derived from a respective source SRC1 . . . SRC4. The TSmerger unit 2 similarly has a plurality of output ports TSout0 ... TSout3, three of which are illustrated by way of example. These output ports are for the output of high bit rate output streams labeled HBR0 ... HBR2. Each output stream is supplied to a respective destination dest0, dest1, dest2 respectively. These destinations can take any suitable form, for example they can be programmable transport interfaces (PTI) which process the stream data, or they could be audio or video systems or anything capable of handling a data stream.

The TSmerger unit 2 itself is capable of merging the lower bit rate transport streams to individual higher bit rate streams for processing by respective single PTIs. Each input stream can be routed to any output stream, and each input stream may be distributed to multiple output streams and thereby to multiple destinations.

The TSmerger unit 2 illustrated in FIG. 1 includes a memory (SRAM) 3 for holding packets of the input streams, a packet allocation table 4 (PAT), a source to destination matrix 6 and a processing means 8 which implements an algorithm to control removal of packets from the SRAM 3.

The processing means 8 controls the removal of packets from the SRAM 3 to the destinations dest0, dest1, dest2 in such a way as to maintain maximum bandwidth, while allowing any source stream to go to any destination. Packets from multiple sources are merged without breaking individual packets (i.e. streams are merged at the packet level and not at the byte level) and packets from a single stream are read from the SRAM in the correct order, that is in the order in which they arrived.

To maintain maximum bandwidth, in the preferred embodiment each packet is only read from the SRAM 3 once, so that if a packet from a particular input port is destined for more than one destination, the packet is only output from the SRAM 3 when the ports for both of those destinations are free.

The source to destination matrix 6 is a data structure illustrated in FIG. 2. This matrix 6 maps sources to destinations and can be changed on the fly. The source numbers are indicated on the left hand side of the rows of the matrix 6, and the destinations are illustrated at the top of the columns of the matrix 6. A "1" in each square of the matrix indicates that a particular source is to be mapped to a particular destination. A "0" indicates that that source stream must not be mapped to that particular destination. As is clear from the matrix 6 in FIG. 2, some source streams (i.e., source 2 and source 4) may be mapped to more than one destination. Although sources 2 and 4 are shown as mapping to more than one destination, any of the sources may map to one or a plurality of destinations.

FIG. 3 illustrates the packet allocation table 4 which takes the form of a second data structure. This data structure takes the form of an array including a plurality of slots SLOT1, SLOT2, etc, each slot including a source identifier (src_id) of a particular packet in association with the address (addr) which is the start address of that packet in the SRAM 3. The source identifier is inserted into the packet header of each packet at the respective input port of the TSmerger unit 2 at which the packet is received. The source identifier insertion circuitry is labeled 7 in FIG. 1. The packet allocation table 4 includes a write pointer wr_pointer and three destination pointers, dest0, dest1, dest2 each associated with a particular destination as illustrated in FIG. 1. The pointers are implemented in any suitable known way. In FIG. 3 the write pointer is shown pointing to the next available empty slot (SLOT5) in the packet allocation table 4. The destination pointers dest0, dest1, dest2 are shown pointing to the two top full slots of the array (SLOTS 3, 4) illustrating the temporary assignment of those pointers when those slots of the array were just filled as will be described in more detail later.

FIGS. 4A to 4D illustrate how the algorithm assigns destination pointers. FIG. 4A illustrates the state of the pointers as in FIG. 3, that is with the dest0 and dest2 pointers directed at SLOT3 holding the packet from source 2 and dest1 pointer directed at SLOT4 holding the most recently loaded packet from source 1. This is the status when an incoming packet is newly loaded into the SRAM 3.

Figure 4B:
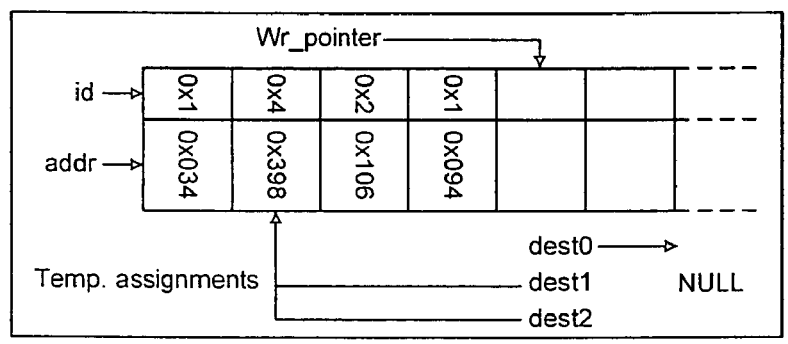

The next temporary assignment of destination pointers is illustrated in FIG. 4B. The source identifier in the next slot down of the array, SLOT2, is read which identifies source 4 SRC4. From the source to destination matrix 6 it is determined that packets from this source are destined for destinations 1 and 2 and therefore the destination pointers dest1, dest2 are realigned to this slot. The destination pointer dest0 is reassigned to null. The source to destination matrix 6 acts as an assignment data structure for identifying the destinations to which the input packet streams are routed.

Figure 4C:
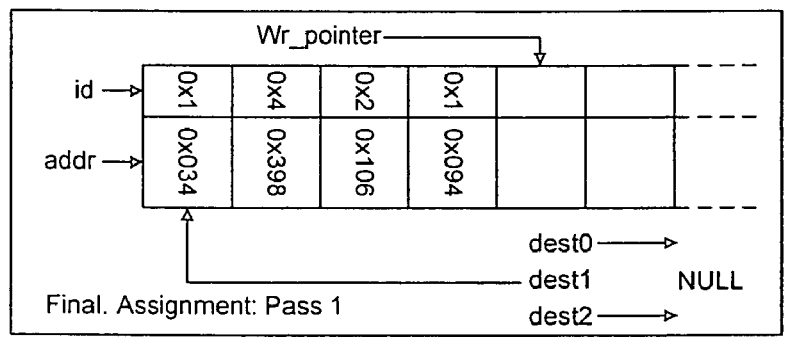

The next assignment of destination pointers is shown in FIG. 4C. This represents the first part of the final assignment, because the assignment algorithm has reached the end most slot, SLOT1, of the array. This slot holds the packet from source 1 which is destined for destination 1 and therefore the dest1 pointer is assigned to this slot. The dest0 and dest2 pointers are assigned to null.

Figure 4D:
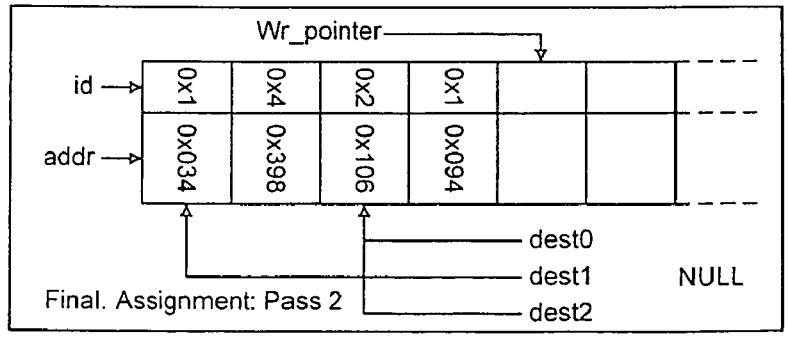

FIG. 4D illustrates the next pass in the final assignment. The source identifier in SLOT2 of the array identifies SRC4 as the source which is destined for destinations 1 and 2. There is no point assigning the destination pointer dest2 to this packet because the destination pointer dest1 has already been assigned to the packet which is identified in the SLOT1 of the array and, for bandwidth reasons, the packet should be removed to both destination ports simultaneously. Therefore, no destination pointers are assigned to this slot. In the next slot is a packet from source 2 which is destined for destinations 0 and 2, and so these destination pointers are set for that slot.

After the assignment of destination pointers has been completed, the algorithm controls the SRAM 3 to output the identified packets according to the status of the destination pointers in the packet allocation table.

Figure 5A:
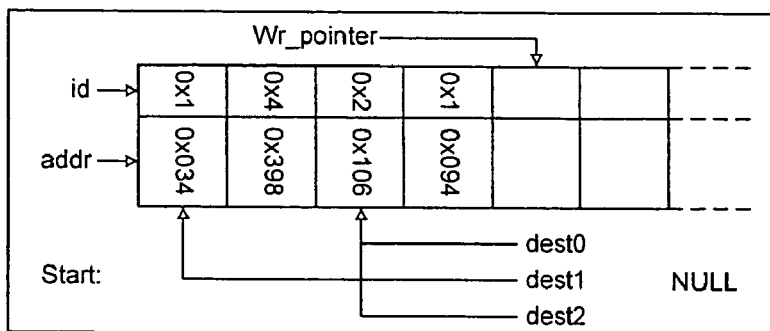
FIGS. 5A to 5D illustrate the effect on the packet allocation table of adding packets into and removing packets from the memory.
Figure 5B:
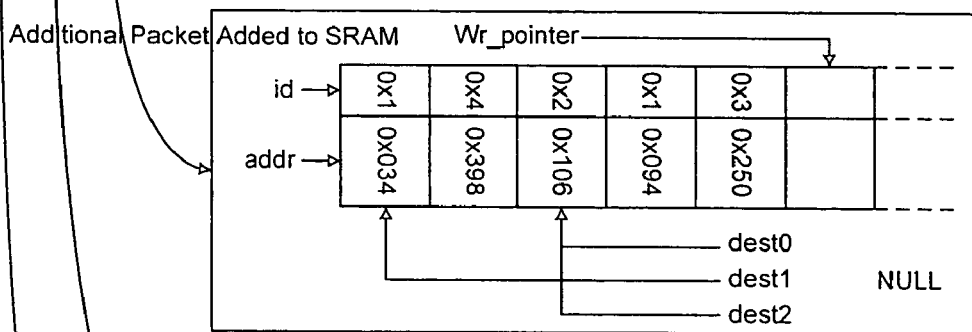

FIGS. 5A to 5D illustrate the effect of moving and adding packets into the SRAM 3. FIG. 5A shows the status of the packet allocation table 4 in FIG. 4D, that is with four slots full, representing four packets in the SRAM 3 and the destination pointers having been finally assigned. FIG. 5B shows the effect of adding an additional packet to the SRAM 3. This packet has come in from source 3 and data identifying the packet is added into the vacant slot, SLOT5, of the packet allocation table pointed to by the write pointer wr_pointer. The write pointer is incremented to point to the next vacant slot, SLOT6. The destination pointers remain in place.

Figure 5C:
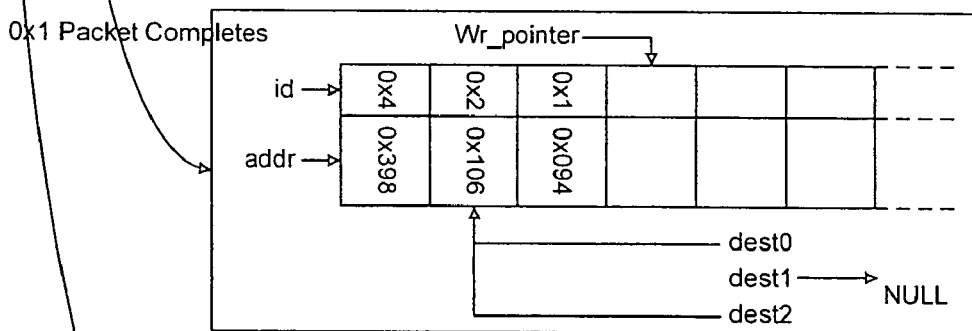

FIG. 5C shows the state of the packet allocation table when the packet identified in the first slot of the table has been completely transmitted from the SRAM 3 out of its allocated destination port dest1. Note that the write pointer wr_pointer has been decremented to point to the next available slot, SLOT4, and that the assignment of the destination pointer dest1 has been allocated back to null. The next packet to be transmitted from the SRAM 3 is that identified by the data in SLOT2 and this packet is transmitted out of the destination ports dest0 and dest2 as identified by the destination pointers.

Figure 5D:
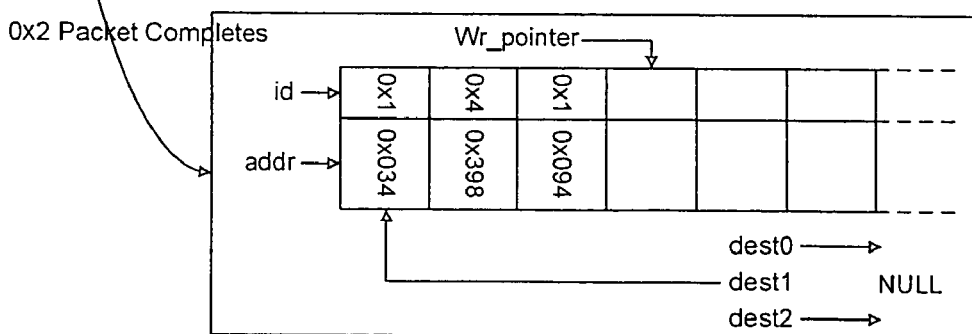

FIG. 5D shows the effect of removing this packet, i.e. the one identified by the data in SLOT3 in FIG. 5A, from the SRAM 3, before the one identified by the data in SLOT1. In this case the data defining the subsequent packet moves up one slot in the array and the destination pointers dest0 and dest2 are reassigned to null.

It will be appreciated that whether or not packets are removed from the SRAM depends on the capability of destinations to receive them. When destinations are capable of accepting data, they return a signal to the TSmerger unit 2 indicating that they can accept data and then a packet is transmitted. The speed at which packets are removed from the SRAM may also depend on the length of the packets. Generally, each packet stream will contain packets of a common length, although the packet length can differ between different packet streams.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A stream routing unit to route each of a plurality of input packet streams to any of a plurality of destinations, the stream routing unit comprising:
    a plurality of input ports to receive for receiving respective input streams;
    a plurality of output ports associated with respective destinations to which the input packet streams can be routed;
    a store to hold packets of the input packet streams at addressable locations each identifiable by an address, said store being shared by all of said input ports and said output ports;
    an assignment data structure to identify for each source of the input packet stream at least one destination to which each input packet stream is to be routed;
    a packet allocation table comprising an array including a plurality of slots to hold for each new incoming packet a source identifier that identifies the source of the incoming packet and the address in the store where the incoming packet is held, the packet allocation table further including a plurality of destination pointers, each destination pointer associated with one of the output ports, each destination pointer being assignable to any slot so as to identify the output ports associated with the intended destinations of a held packet, the assigning of each destination pointer to a slot being derived using the assignment data structure; and
    a processor to control the removal of packets from the store and the sending of the removed packets out through the plurality of output ports using the assigned destination pointers, wherein an order of packet removal from the store for sending out through the output ports depends on whether the output ports through which the removed packets are to be sent based on the assigned destination pointers are free to send out packets.

2. The stream routing unit according to claim 1, wherein the input packet streams have a lower bit rate than output streams into which they are merged at the plurality of output ports.

3. The stream routing unit according to claim 1, wherein the assignment data structure is a data matrix.

4. The stream routing unit according to claim 1, wherein the packet allocation table is associated with a write pointer which points to the next available slot in the array for the source identifier and address of the next incoming packet.

5. The stream routing unit according to claim 1, wherein the packets of a said input stream are of a common length.

6. The stream routing unit according to claim 1, wherein the destination pointers are assigned by an algorithm.

7. The stream routing unit according to claim 6, wherein after the assignment of destination pointers is completed, the algorithm controls the store to output a packet according to the assigned destination pointers.

8. The stream routing unit according to claim 1, wherein held packets are output in the order in which they are received.

9. The stream routing unit according to claim 1, wherein the held packet is output only when all of the output ports associated with the intended destinations of the held packet are free.

10. A data communication system to route incoming packets to at least one destination, the system comprising:
    a plurality of packet stream sources each generating a packet stream;
    a stream routing unit comprising:
    a plurality of input ports to receive respective input packet streams;
    a plurality of output ports associated with respective destinations to which the input packet streams can be routed;
    a store to hold packets of the input packet streams at addressable locations each identifiable by an address, said store being shared by all of said input ports and output ports;
    an assignment data structure to identify for each source of the input packet stream at least one destination to which each input packet stream is to be routed;
    a packet allocation table an array including a plurality of slots to hold for each incoming packet a source identifier to identify the source of the incoming packet and the address in the store where the incoming packet is held, the packet allocation table further including a plurality of destination pointers, each destination pointer associated with one of the output ports, each destination pointer being assignable to any slot so as to identify the output ports associated with the intended destinations of a held packet, the assigning of each destination pointer to a slot being derived using the assignment data structure; and
    a processor to control the removal of packets from the store and the sending of the removed packets out through the plurality of output ports using the assigned destination pointers, wherein an order of packet removal from the store for sending out through the output ports depends on whether the output ports through which the removed packets are to be sent based on the assigned destination pointers are free to send out packets; and
    a plurality of destinations for receiving packets of the packet streams generated by the sources.

11. The data communication system according to claim 10, wherein at least one of the destinations comprises a programmable transport interface.

12. The data communication system according to claim 10, wherein the input packet streams have a lower bit rate than output streams into which they are merged at the plurality of output ports.

13. A method of routing packet streams from a plurality of sources to any of a plurality of destinations, the method comprising:
    receiving said packet streams at a plurality of input ports each having an input port identifier;

providing an assignment data structure identifying for each input port identifier at least one intended output port to which the packet stream received at the input port is to be routed;

holding each packet of the packet stream in a store at an addressable location identifiable by an address in that store;

providing a packet allocation table comprising an array including a plurality of slots, each slot storing the input port identifier of the input port which received a packet from one of the packet streams and the address in the store where the received packet is held;

providing a plurality of destination pointers, each destination pointer associated with an output port, each destination pointer being assignable to any slot of the packet allocation table;

using said assignment data structure identifying the intended output port for each input port identifier to assign each destination pointer to a slot of the packet allocation table based on the output port associated with the destination pointer and the input port identifier that is stored in the slot and identified with that output port by the assignment data structure;

retrieving the packet from the store at the address contained in the slot to which each destination pointer is assigned; and routing the addressed packet from the store to the or each output port associated with the assigned destination pointer(s).

14. The method according to claim 13, wherein the input packet streams have a lower bit rate than output streams into which they are merged at the output ports.

15. The method according to claim 13 further comprising:
associating each slot with a write pointer which points to the next available slot in the array for storing the input port identifier and address of the received packet.

16. A device for delivering incoming packets to at least one destination, the device comprising:
a plurality of input ports, each input port having an input port identifier;
a plurality of output ports;
an addressable memory to store incoming packets at a plurality of address locations in the memory;
a matrix to map at least one input port identifier to at least one output port;
a packet allocation table including a plurality of slots, each slot to associate an input port identifier for the input port at which a particular packet is received with the address location in the addressable memory where the particular packet is stored;
a plurality of destination pointers associated with the packet allocation table, each destination pointer having an associated output port, and each destination pointer being assignable to any slot in the packet allocation table; and
an algorithm to control removal of the incoming packets from the memory to at least one output port, the algorithm assigning each destination pointer to a slot in the packet allocation table based on the output port associated with the destination pointer and the input port identifier within the slot of the packet allocation table and mapped to the output port by the matrix, wherein the packet at the address location within the slot of the packet allocation table assigned to the destination pointer is retrieved from the addressable memory and delivered to the output port associated with that destination pointer.

17. A stream routing unit, comprising:
a plurality of input ports, each input port to receive an input packet stream;
a plurality of output ports, each output port to output outputting an output packet stream;
a memory including a plurality of addressable memory locations;
a matrix to map each input port receiving the input packet streams to one or more output ports for receiving the packets within those input packet streams;
an insertion circuit to insert into a header of each packet of the received input packet stream an input port identifier for the input port which received the input packet stream;
a processor to store packets of the input packet streams in the memory and to retrieve stored packets from the memory to form the output packet streams;
the processor to fill a packet allocation table which includes a plurality of slot locations, each slot location storing the input port identifier from the packet header which identifies the input port that received the input packet stream to which a given packet belongs linked in the slot of the packet allocation table to an address in the memory for the addressable memory location where that given packet has been stored by the processor;
a destination pointer, associated with each one of the output ports, implemented by the processor to point to a slot location in the packet allocation table from which the address of the given packet is retrieved, the destination pointer pointing to the slot location when the input port identifier in the slot matches the input port identifier mapped through the matrix to an output port associated with that destination pointer;
the processor further to retrieve the given packet from the memory at the address provided in the slot location pointed at by the destination pointer, and send the retrieved given packet to each output port associated with that destination pointer for inclusion in the output packet stream of the output port.

18. The stream routing unit of claim 17 further comprising a write pointer implemented by the processor to point to an open slot location in the packet allocation table to which the source identifier and address of the given packet are written.

19. The stream routing unit of claim 17, wherein a bit rate of the input packet streams is lower than a bit rate of the output packet streams.

20. A method of routing packet streams from a plurality of sources to any of a plurality of destinations, the method comprising:
receiving said packet streams at a plurality of input ports;
storing each packet of the packet stream at an addressable location identifiable by an address;
providing an assignment data structure identifying for each source of the input packet stream at least one destination to which the packet stream received at the input port is to be routed;
providing a packet allocation table comprising an array including a plurality of slots, each slot storing a source identifier of identifying the source of the packet from one of the packet streams and the address of the location where the received packet is stored;
providing a plurality of destination pointers, each destination pointer associated with an output port for one of the destinations, each destination pointer being assignable to any slot of the packet allocation table so as to identify the output ports associated with the intended destinations of a stored packet;

using said assignment data structure identifying the intended destination from the packet source to assign each destination pointer to a slot of the packet allocation table;

removing stored packets from the address contained in the slot to which each destination pointer is assigned, wherein an order of packet removal for sending out through the output ports depends on whether the output ports through which the removed packets are to be sent based on the assigned destination pointers are free to send out packets; and routing the addressed packet to the or each output port associated with the assigned destination pointer(s).

21. A stream routing unit, comprising:

a plurality of input ports, each input port to receive an input packet stream;

a plurality of output ports, each output port to output an output packet stream;

an insertion circuit coupled to the input ports and adapted to receive the input packet streams and insert into a header of each packet in the received input packet stream an input port identifier of the input port which received that input packet stream;

a matrix to map an assignment of which output ports of the stream routing unit are to output the packet streams received at each input port;

a memory including a plurality of addressable memory locations, the memory adapted to store packets from the received input packet streams at the addressable memory locations;

a packet allocation table including a plurality of slot locations, each slot location storing a) the input port identifier from the packet header which identifies the input port that received the input packet stream to which a given packet belongs and b) an address in the memory for the addressable memory location where that given packet has been stored;

a destination pointer, associated with each one of the output ports, each destination pointer being assigned to point to one of the plurality of slot location when the input port identifier in the slot matches the input port identifier mapped through the matrix to an output port associated with that destination pointer;

a processor to retrieve the given packet from the memory at the address provided in the slot location pointed at by each destination pointer, and send the retrieved given packet to the output port associated with that destination pointer for inclusion in the output packet stream at the output port.

* * * * *

UNITED STATES PATENT AND TRADEMARK OFFICE
CERTIFICATE OF CORRECTION

Page 1 of 1

| | |
|---|---|
| PATENT NO. | : 7,720,112 B2 |
| APPLICATION NO. | : 10/779466 |
| DATED | : May 18, 2010 |
| INVENTOR(S) | : Matt Morris |

It is certified that error appears in the above-identified patent and that said Letters Patent is hereby corrected as shown below:

Column 5, claim 1, line number 26, please delete the words "for receiving" so that the line reads as follows:

a plurality of input ports to receive respective

Column 5, claim 1, line number 39, please delete the word "new" so that the line reads as follows:

plurality of slots to hold for each incoming packet a

Column 6, claim 10, line number 33, the word -- comprising -- was erroneously deleted and should be added back in, so that the line reads as follows:

a packet allocation table comprising an array including a plurality of

Column 8, claim 17, line numbers 4-5, please delete the word "outputting" so that the lines read as follows:

a plurality of output ports, each output port to output an output packet stream;

Signed and Sealed this
Fourteenth Day of August, 2012

David J. Kappos
*Director of the United States Patent and Trademark Office*